Patented Nov. 13, 1928.

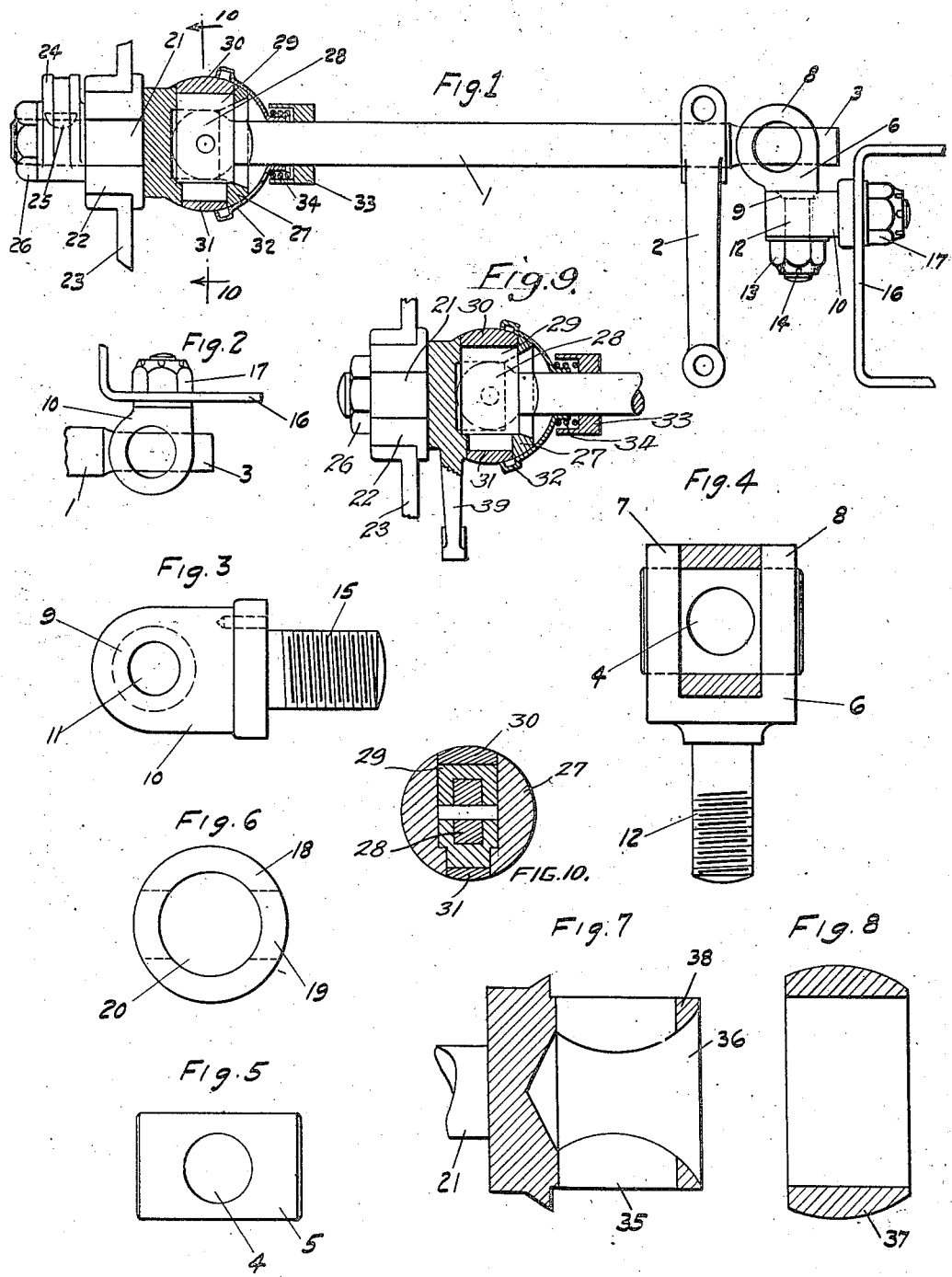

1,691,567

UNITED STATES PATENT OFFICE.

ADIEL Y. DODGE, OF SOUTH BEND, INDIANA, ASSIGNOR, BY MESNE ASSIGNMENTS, TO BENDIX BRAKE COMPANY, OF CHICAGO, ILLINOIS, A CORPORATION OF ILLINOIS.

CONTROL MECHANISM FOR VEHICLE WHEEL BRAKES.

Application filed March 29, 1924. Serial No. 702,767.

This invention relates to control mechanism for vehicle wheel brakes, particularly for those used on the front wheels of an automotive vehicle.

It is the object of my invention to provide a control mechanism which is simple in construction, cheap to manufacture and easy to apply.

Another object of my invention is to provide a control mechanism which can be used for either internally or externally acting brakes or both.

My invention will be best understood by reference to the attached drawing, in which:

Figure 1 is an assembled view of the control mechanism.

Figure 2 is a modified form of the chassis support for the control shaft.

Figure 3 is a plan view of one of the details of the joint used with the control shaft.

Figure 4 is an elevational view of a part of the control shaft joint at the chassis end of the shaft.

Figure 5 is a view of one of the joint members shown in Fig. 4.

Figure 6 is another view of one of the joint members shown in Fig. 4.

Figure 7 is a partial view of a modified form of the camshaft end of the control mechanism.

Figure 8 is a view of a ring member used with the construction shown in Fig. 7.

Figure 9 is a view corresponding to part of Figure 1, but showing a modification for operating an external brake.

Figure 10 is a section on the line 10—10 of Figure 1.

In the drawings, 1 is a control shaft having an operating lever 2 attached thereto in any satisfactory manner. The inner end 3 of the shaft 1 passes through a transverse hole 4 in a cylindrical member 5, which fits in a bore of a carrier member 6. The carrier member 6 has two forks 7 and 8 between which the end of the shaft 3 is positioned, the cylindrical member 5 being pivoted in the two forks 7 and 8 as clearly indicated in Fig. 4. The carrier member 6 has an arcuately formed shoulder fitting in a corresponding seat 9 of a support member 10 that has a hole 11 therethrough to receive the threaded end 12 of the member 6, which is retained in position on the seat 9 by means of a castellated nut 13, which can be set to the right point and held there by a suitable pin passing through the end 12 of the member 6 and which pin fits in one of the depressions 14 of the nut 13, thereby allowing the member 6 to be swiveled on the seat 9. The member 10 has a threaded extension 15 which passes through the side of the chassis 16 and is held thereto in any suitable manner as by a castellated nut 17. This joint connection provides a rotary motion through the member 6 and an arcuate motion of the shaft 1 through the medium of the cylindrical member 5.

As an optional construction a tubular member 18 may be used to fill in the space between the forks 7 and 8 of the member 6. The member 18 has a transverse hole 19 for the shaft end 3 and a longitudinal hole 20 for the member 5. This construction presents a more pleasing appearance to this part of the joint and it is also less apt to collect dirt. It also furnishes an additional bearing surface for the end 3 of the control shaft.

As an alternative construction for certain classes of automobiles I may use a support for the shaft end 3 similar to that illustrated in Fig. 2 in which the shaft end 3 is attached directly to the support member 10 without the carrier member 6, it being understood that the member 10 is so mounted to the chassis 16 as to swivel therein, the rest of the joint being constructed the same as in Fig. 1 or in Fig. 4. This knuckle and swivel joint arrangement gives considerable flexibility in making any application, as the support member may be on the side or the bottom part of the frame member of the car.

The wheel end of the shaft 1 is connected to a brake actuating shaft 21 which is supported in a bushing 22 carried in member 23. On the inner end of the shaft 21 is r ⎵nted a cam 24, the same being held to tue shaft 21 in any suitable manner such as by a key 25 and a nut 26. It is understood that the cam 24 is used for actuating internal brake shoes within the brake drum, the brake drum not being shown as it is a part well understood. The outer end of the actuating shaft 21 has an enlarged arcuately formed end 27, which has a transverse bore through it and a longitudinal opening in the end to receive the flattened end 28 of the control shaft 1 in a somewhat similar manner as that set forth in my application, Serial No. 697,472, filed March 7, 1924; that is to say, the shaft end 28 is held in place by the slotted cylinder having members 29, one lying on one side of the shaft end 28 and the other on the other side within the transverse bore, the openings of which are closed by the plugs 30 and 31. These plugs may be press fitted into the bore or screwed therein, they being of the same outer contour as the rest of the enlarged portion of the actuating shaft 21, in order to receive the dust protecting cap 32 which is held in position by the member 33 attached to the shaft 1 and a spring 34. Instead of using the plugs 30 and 31, I may use a construction on the outer end of the actuating shaft 21 as illustrated in Fig. 7, wherein the transverse bore is indicated as 35 and the longitudinal bore or opening as 36. A ring member 37 is adapted to slide over the portion 38 to close the transverse bore 35 and to retain the members 29 and shaft end 28 in position in the transverse bore 35. In addition, the actuating shaft 21 may have a lever 39 attached thereto (shown in Fig. 9) for the actuation of external brakes.

The modifications herein recited indicate that the details of my invention may be varied considerably without departing from the spirit of my invention and the scope of the appended claims.

Having thus described my invention, what I claim is:

1. In a control mechanism for vehicle wheel brakes, a control shaft, means for operating the control shaft, a support for the end of the control shaft comprising a double joint consisting of a cylindrical member having a transverse bore for the end of said control shaft, a carrier member for and in which said cylindrical member may turn, and a support member attached to a non-rotating part of the vehicle for oscillatably supporting said carrier member.

2. In a control mechanism for vehicle wheel brakes, a control shaft, means for operating the control shaft, a support for the end of the control shaft comprising a double joint consisting of a cylindrical member having a transverse bore for the end of said control shaft, a forked carrier member supporting the cylindrical member so said shaft end passes therethrough between said forks, and a support member attached to a non-rotating part of the vehicle for oscillatably supporting said carrier member.

3. In a control mechanism for vehicle wheel brakes, a control shaft, means for operating the control shaft, a support for the end of the control shaft comprising a joint consisting of a cylindrical member having a transverse bore for the end of said control shaft, a carrier member for and in which said cylindrical member may turn, and means for supporting the carrier member so it may have an oscillatory movement.

4. In a control mechanism for vehicle wheel brakes, a control shaft, means for operating the control shaft, a support for the end of the control shaft comprising; a joint consisting of a cylindrical member having a transverse bore for the end of said control shaft, a forked carrier member supporting the cylindrical member so said shaft end passes therethrough between said forks, and means for supporting the carrier member so it may have an oscillatory movement.

5. In a control mechanism for vehicle wheel brakes, a control shaft, means for operating the control shaft, a support for the end of the control shaft comprising; a double joint consisting of a knuckle and a swivel, said knuckle including a horizontal cylindrical member having a transverse bore for said control shaft end and a carrier member for supporting said cylindrical member, so the passage of said shaft end therethrough will prevent the displacement of said cylindrical member from the carrier member, said swivel including a support for the carrier member fastened to a nonrotating part of the vehicle, the engaging surfaces of the support and said member being arranged so relative relation of one with respect to the other is obtained.

6. In a control mechanism for vehicle wheel brakes, a control shaft, means for operating the control shaft, a support for the end of the control shaft comprising; a double joint consisting of a cylindrical member having a transverse bore for the end of said control shaft, a forked carrier member supporting the cylindrical member so said shaft end passes therethrough between said forks, a support member attached to a non-rotating part of the vehicle for oscillatably supporting said carrier member and means for filling up the space between said forks of the carrier member comprising a tubular member fitting over the cylindrical member and having a bore to align with the bore in said cylindrical member.

7. In a control mechanism for vehicle wheel brakes, a control shaft, means for operating the control shaft, a support for the end of the control shaft comprising; a double joint consisting of a cylindrical member having a transverse bore for the end of said control shaft, a forked carrier member supporting the cylindrical member so said shaft end passes therethrough between said forks, a support member attached to a non-rotating part of the vehicle for oscillatably supporting said carrier member and a cover for said cylindrical member consisting of a member fitting over the cylindrical member between said forks and of substantially the same height as the forks and having a cross hole for the said shaft end.

8. In a control mechanism for vehicle wheel brakes, a control shaft, means for operating the control shaft, a support for the end of the control shaft comprising; a double joint consisting of a cylindrical member having a transverse bore for the end of said control shaft, a carrier member for and in which said cylindrical member may turn, said carrier member having an extended part with a bearing surface thereon and a support member attached to a non-rotating part of the vehicle, and having a hole therein to receive the extending part of said carrier member as well as a bearing surface to cooperate with the bearing surface on the carrier member.

9. In a control mechanism for vehicle wheel brakes, a brake actuating shaft having a support and an enlarged arcuately shaped end, said end having a longitudinal opening and a transverse bore, a control shaft having a flattened end adapted to enter the longitudinal opening, said end having a hole therein, means for completing a universal joint positioned in the transverse bore comprising parts engaging both sides of said flattened shaft end and a pin passing through the hole in the control shaft and said parts, and plugs positioned in said transverse bore for preventing displacement of the parts located therein.

10. In a control mechanism for vehicle wheel brakes, a brake actuating shaft having a support and an enlarged arcuately shaped end formed with an integral lever, said end having a longitudinal opening and a transverse bore, a control shaft having a flattened end adapted to enter the longitudinal opening, flatted members positioned in the transverse bore, one on either side of said flattened shaft end, a pin passing through the flatted members and the shaft end, and means closing both ends of the transverse bore for preventing lateral displacement of the parts located therein.

In testimony whereof, I affix my signature.

ADIEL Y. DODGE.